(12) United States Patent  
Yu et al.

(10) Patent No.: US 9,389,670 B2  
(45) Date of Patent: Jul. 12, 2016

(54) PORTABLE ELECTRONIC APPARATUS AND POWER MANAGEMENT METHOD

(71) Applicant: Quanta Computer Inc., Taoyuan Shien (TW)

(72) Inventors: Chun-Jie Yu, Keelung (TW); Yu-Hui Chen, Taoyuan County (TW)

(73) Assignee: QUANTA COMPUTER INC., Tao Yuan Shien (TW)

(*) Notice: Subject to any disclaimer, the term of this patent is extended or adjusted under 35 U.S.C. 154(b) by 366 days.

(21) Appl. No.: 14/031,413

(22) Filed: Sep. 19, 2013

(65) Prior Publication Data

US 2015/0026501 A1 Jan. 22, 2015

(30) Foreign Application Priority Data

Jul. 17, 2013 (TW) .............................. 102125551 A

(51) Int. Cl.  
*G06F 1/32* (2006.01)

(52) U.S. Cl.  
CPC ............ *G06F 1/3212* (2013.01); *G06F 1/3243* (2013.01); *Y02B 60/1239* (2013.01); *Y02B 60/1292* (2013.01)

(58) Field of Classification Search  
CPC . G06F 1/3212; G06F 1/3243; Y02B 60/1239; Y02B 60/1292  
See application file for complete search history.

(56) References Cited

U.S. PATENT DOCUMENTS

| | | | | |
|---|---|---|---|---|
| 7,062,394 | B2* | 6/2006 | Sun | G06F 1/206 702/75 |
| 8,438,125 | B2* | 5/2013 | Tung | G06F 1/3203 703/18 |
| 8,904,209 | B2* | 12/2014 | Davis | G06F 1/3206 709/220 |
| 2004/0059545 | A1* | 3/2004 | Sun | G06F 1/206 702/186 |
| 2013/0124885 | A1* | 5/2013 | Davis | G06F 1/3206 713/320 |

* cited by examiner

*Primary Examiner* — M Elamin  
(74) *Attorney, Agent, or Firm* — Rabin & Berdo, P.C.

(57) ABSTRACT

A portable electronic apparatus and a power management method are disclosed. The portable electronic apparatus comprises a processor and an embedded controller (EC). The EC determines whether the processor starts a throttling mechanism according to a current power consumption, a proportional term, a last power consumption, a lower bound, a delta power and a derivative term. The EC determines whether the processor cancels the throttling mechanism according to the current power consumption, the lower bound, a count that the power consumption is lower than the lower bound, and an integral term.

20 Claims, 5 Drawing Sheets

PORTABLE ELECTRONIC APPARATUS AND POWER MANAGEMENT METHOD

This application claims the benefit of Taiwan application Serial No. 102125551, filed Jul. 17, 2013, the disclosure of which is incorporated by reference herein in its entirety.

TECHNICAL FIELD

The disclosure relates in general to an electronic apparatus, and more particularly to a portable electronic apparatus and a power management method.

BACKGROUND

Referring to FIG. 1, a schematic diagram of an upper bound and a lower bound is shown. As efficiency of notebook increases, processor also increases its power consumption. The processor of conventional notebook determines whether to start or cancel a throttling mechanism according to an upper bound UB and a lower bound LB. When power consumption is greater than the upper bound UB, the processor correspondingly starts the throttling mechanism to avoid residual capacity of battery being inadequate. Conversely, when power consumption is greater than the lower bound LB, the processor correspondingly cancels the throttling mechanism to increase efficiency of notebook.

SUMMARY

The disclosure is directed to a portable electronic apparatus and a power management method.

According to one embodiment, a portable electronic apparatus is disclosed. The portable electronic apparatus comprises a processor and an embedded controller (EC). The EC captures a current power consumption from the battery, and calculates a delta power between the current power consumption and a last power consumption. The EC sets a proportional term to be equal to an upper bound, and determines whether a current over power protection level (OPPL) is equal to a first protection level or a second protection level. When the OPPL is equal to the first protection level, the EC executes a first protection level procedure during which the EC determines whether to set the OPPL to be equal to the second protection level according to the current power consumption, the proportional term, the last power consumption, the lower bound, the delta power and the derivative term. When the OPPL is equal to the second protection level, the EC executes a second protection level procedure during which the EC determines whether to set the OPPL to be equal to the first protection level according to the current power consumption, the lower bound, a count that the power consumption is lower than the lower bound and an integral term. When the OPPL is equal to the first protection level, the EC controls the processor to cancel the throttling mechanism. When the OPPL is equal to the second protection level, the EC controls the processor to start a throttling mechanism.

According to another embodiment, a power management method is disclosed. The power management method comprises following steps. A current power consumption is captured from the battery. A delta power between the current power consumption and a last power consumption is calculated. A proportional term is set to be equal to an upper bound. Whether a current over power protection level (OPPL) is equal to a first protection level or a second protection level is determined. When the OPPL is equal to the first protection level, a first protection level procedure is executed. During the first protection level procedure, whether to set the OPPL to be equal to the second protection level according to the current power consumption, the proportional term, the last power consumption, the lower bound, the delta power and the derivative term is determined. When the OPPL is equal to the second protection level, a second protection level procedure is executed. During the second protection level procedure, whether to set the OPPL to be equal to the first protection level according to the current power consumption, the lower bound, a count that the power consumption is lower than the lower bound and an integral term is determined. A processor is controlled to start a throttling mechanism when the OPPL is equal to the second protection level, and is controlled to cancel a throttling mechanism when the OPPL is equal to the first protection level.

The above and other aspects of the disclosure will become better understood with regard to the following detailed description of the non-limiting embodiment (s). The following description is made with reference to the accompanying drawings.

DETAILED DESCRIPTION

First Embodiment

Figure 1:
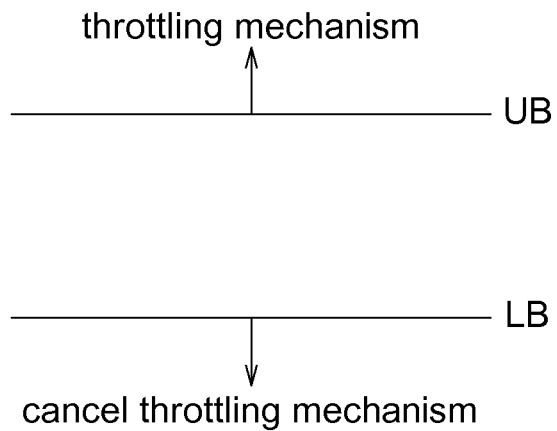
FIG. 1 is a schematic diagram of an upper bound and a lower bound.
Figure 2:
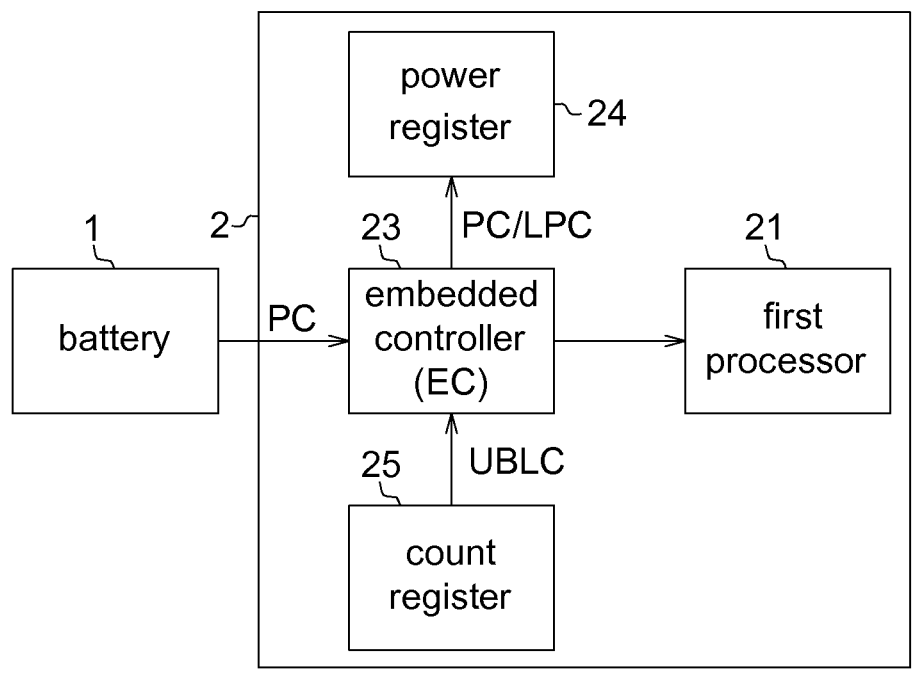
FIG. 2 is a block diagram of a portable electronic apparatus according to a first embodiment.

Referring to FIG. 2, a block diagram of a portable electronic apparatus according to a first embodiment is shown. The portable electronic apparatus 2, such as a notebook, comprises a first processor 21, an embedded controller (EC) 23, a power register 24 and a count register 25. In the first embodiment, the first processor 21 is such as a central processor or a graphic processor, and the power register 24 and the count register 25 are such as in-built in the EC 23. The power register 24 stores a current power consumption PC captured from the battery 1 by the EC 23. In a subsequent process, when the EC 23 again captures another current power consumption PC from the battery 1, the current power consumption PC originally stored in the power register 24 becomes a last power consumption LPC. The count register 25 stores a record parameter UBLC equal to a count that the current power consumption PC is lower than the lower bound LB. When the current power consumption PC is lower than the lower bound LB, the EC 23 progressively increases the record parameter UBLC accordingly.

The EC 23 controls the first processor 21 to start or cancel the throttling mechanism according to the current over power protection level (OPPL). When the over power protection level OPPL is equal to the first protection level OPP_L1, the EC 23 controls the first processor 21 to cancel the throttling mechanism. Conversely, when the over power protection level OPPL is equal to the second protection level OPP_L2, the EC 23 controls the first processor 21 to start the throttling mechanism.

The EC 23 captures the current power consumption PC from the battery 1, and calculates a delta power DP between the current power consumption PC and the last power consumption LPC. The EC 23 sets a proportional term PT to be equal to the upper bound UB, and determines whether the over power protection level OPPL is equal to a first protection level OPP_L1 or a second protection level OPP_L2. When the over power protection level OPPL is equal to the first protection level OPP_L1, the EC 23 executes a first protection level procedure. During the first protection level procedure, the EC 23 determines whether to set the over power protection level OPPL to be equal to the second protection level OPP_L2 according to the current power consumption PC, the proportional term PT, the last power consumption LPC, the lower bound LB, the delta power DP and a derivative term DT.

When the over power protection level OPPL is equal to the second protection level OPP_L2, the EC 23 executes the second protection level procedure. During the second protection level procedure OPP_L2, the EC 23 determines whether to set the over power protection level OPPL to be equal to the first protection level OPP_L1 according to the current power consumption PC, the lower bound LB, a count that the current power consumption PC is lower than the lower bound LB and an integral term IT.

Referring to FIG. 2 and Table 1. If capacity of the battery 1 is 60 VA, then the upper bound UB and the lower bound LB can be designed as 54 VA and 48 VA respectively. Since the EC 23 sets the proportional term PT to be equal to the upper bound UB, the proportional term PT is equal to 54 VA. The derivative term DT and the integral term IT can be designed as 3 VA and 5 counts respectively.

TABLE 1

| Variable Definition | Setting Value |
| --- | --- |
| Upper Bound UB | 54 VA |
| Lower Bound LB | 48 VA |
| Proportional Term PT | 54 VA |
| Derivative Term DT | 3 VA |
| Integral Term IT | 5 counts |

Figure 3:
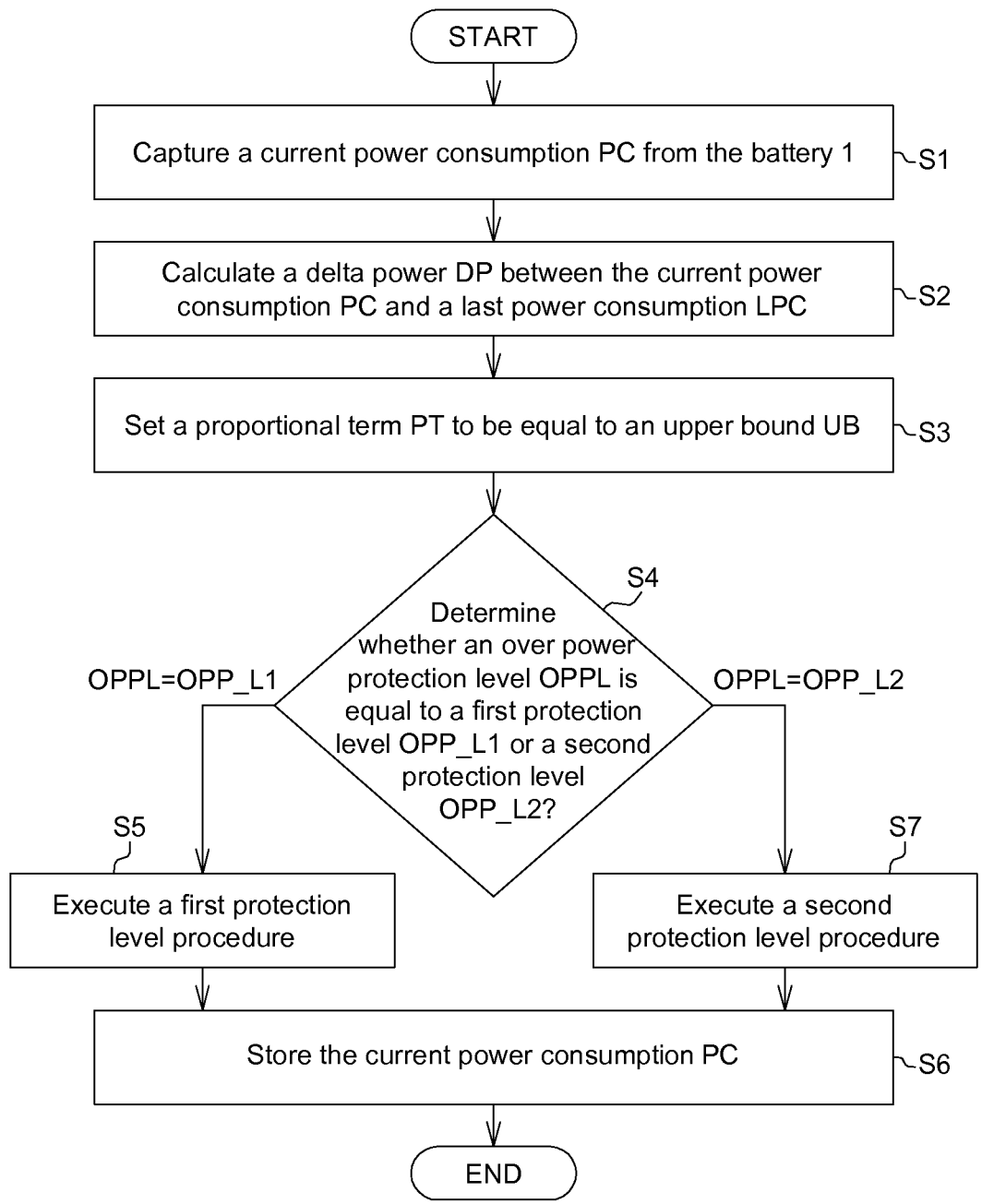
FIG. 3 is a flowchart of a power management method according to a first embodiment.

Referring to FIG. 2 and FIG. 3. FIG. 3 is a flowchart of a power management method according to a first embodiment. The power management method is applied to the above portable electronic apparatus 2, and comprises following step. Firstly, the method begins at step S1. In step S1, the EC 23 captures a current power consumption PC from the battery 1. Then, the method proceeds to step S2. In step S2, the EC 23 calculates a delta power DP between the current power consumption PC and a last power consumption LPC, wherein the delta power DP is equal to the current power consumption PC deducted by the last power consumption LPC. Then, the method proceeds to S3. In step S3, the EC 23 sets a proportional term PT to be equal to an upper bound UB. Then, the method proceeds to S4. In step S4, the EC 23 determines whether an over power protection level OPPL is equal to a first protection level OPP_L1 or a second protection level OPP_L2. When the over power protection level OPPL is equal to the first protection level OPP_L1, the EC 23 controls the first processor 21 to cancel the throttling mechanism. When the over power protection level OPPL is equal to the second protection level OPP_L2, the EC 23 controls the first processor 21 to start the throttling mechanism.

When the over power protection level OPPL is equal to the first protection level OPP_L1, the method proceeds to step S5. In step S5, the EC 23 executes a first protection level procedure. Then, the method proceeds to step S6. In step S6, the power register 24 stores the current power consumption PC. When the over power protection level OPPL is equal to the second protection level OPP_L2, then the method proceeds to step S7. In step S7, the EC 23 executes the second protection level procedure. Then, the method proceeds to step S6, the power register 24 stores the current power consumption PC.

Figure 4:
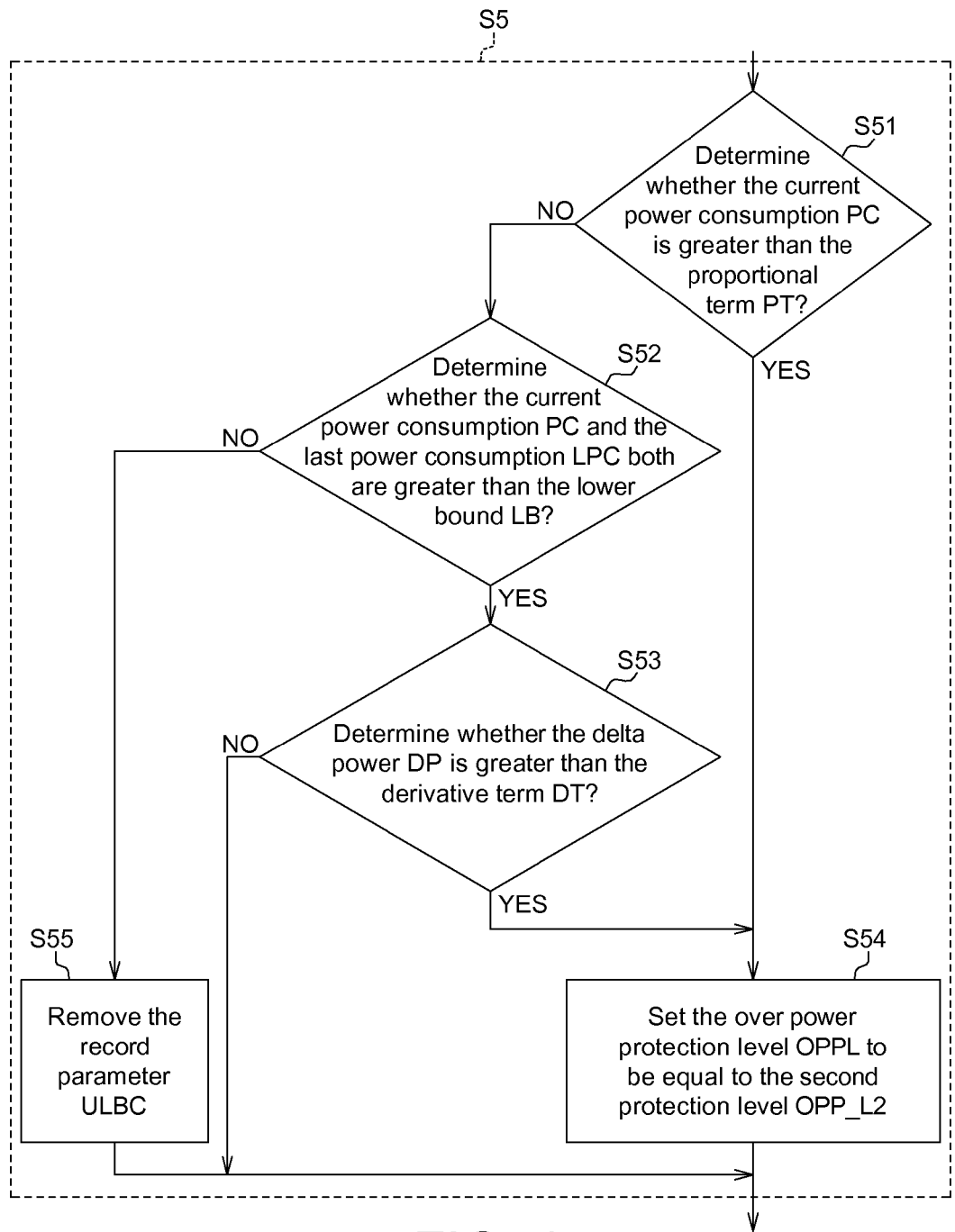
FIG. 4 is a detailed flowchart of step S5.

Referring to FIG. 2, FIG. 3 and FIG. 4. FIG. 4 is a detailed flowchart of step S5. The above step S5 further comprises following steps. In step S51, the EC 23 determines whether the current power consumption PC is greater than the proportional term PT. If the current power consumption PC is greater than the proportional term PT, then the method proceeds to step S54. In step S54, the EC 23 sets the over power protection level OPPL to be equal to the second protection level OPP_L2.

If the current power consumption PC is not greater than the proportional term PT, then the method proceeds to step S52. In step S52, the EC 23 determines whether the current power consumption PC and the last power consumption LPC both are greater than the lower bound LB. If not both the current power consumption PC and the last power consumption LPC1 are greater than the lower bound LB, then the method proceeds to step S55. In step S55, the EC 23 removes the record parameter ULBC equal to a count that the current power consumption PC is lower than the lower bound LB.

If the current power consumption PC and the last power consumption LPC both are greater than the lower bound LB, then the method proceeds to step S53. In step S53, the EC 23 determines whether the delta power DP is greater than the derivative term DT. If the delta power DP is greater than the derivative term DT, then the method proceeds to step S54. In step S54, the EC 23 sets the over power protection level OPPL to be equal to the second protection level OPP_L2.

Figure 5:
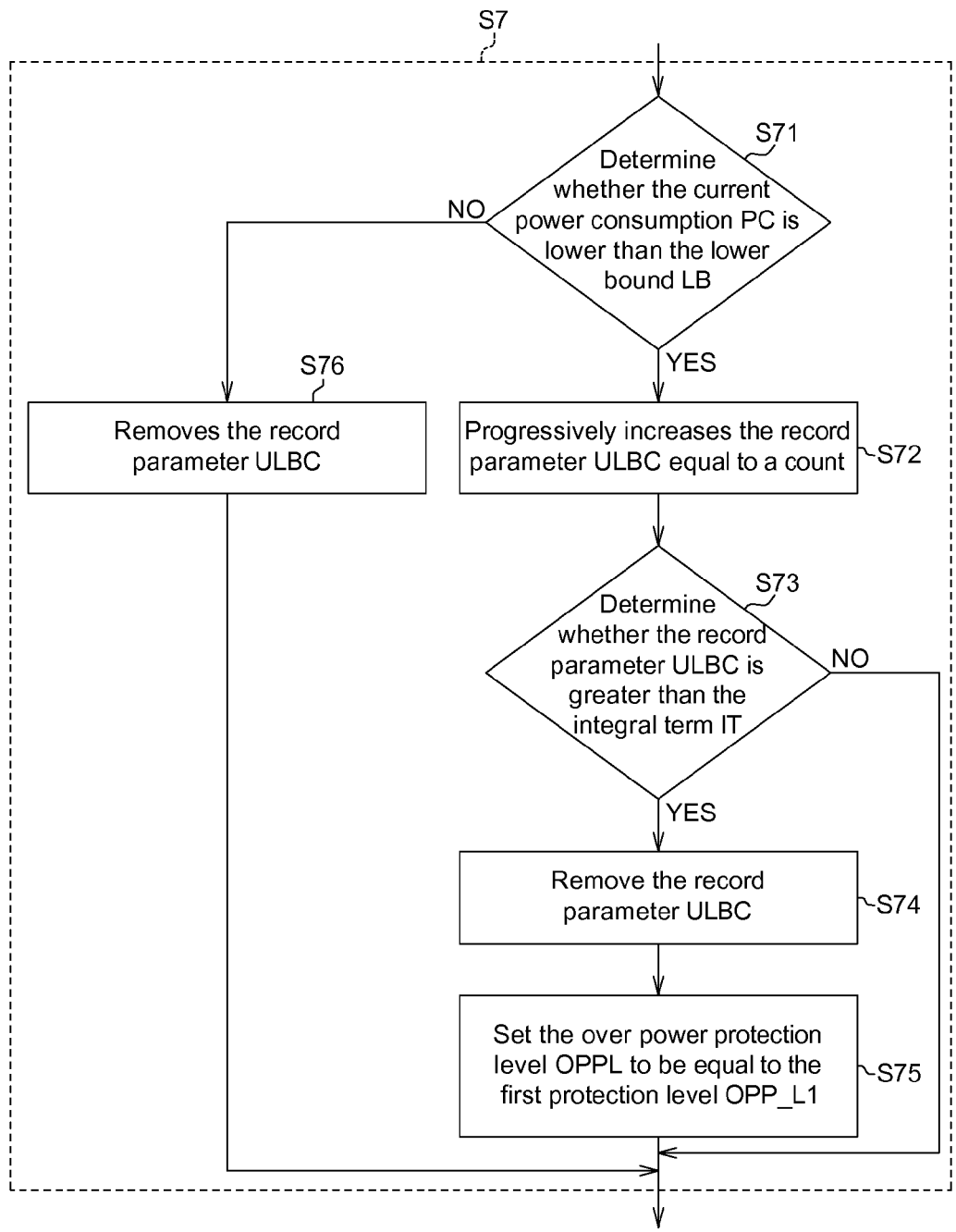
FIG. 5 is a detailed flowchart of step S7.

Referring to FIG. 2, FIG. 3 and FIG. 5. FIG. 5 is a detailed flowchart of step S7. The above step S7 further comprises following steps. In step S71, the EC 23 determines whether the current power consumption PC is lower than the lower bound LB. If the current power consumption PC is lower than the lower bound LB, then the method proceeds to step S72. In step S72, the EC 23 progressively increases the record parameter ULBC equal to a count that the current power consumption PC is lower than the lower bound LB.

Then, the method proceeds to step S73. In step S73, the EC 23 determines whether the record parameter ULBC is greater than the integral term IT. If the record parameter ULBC is greater than the integral term IT, then the method proceeds to step S74. In step S74, the EC 23 removes the record parameter ULBC. Then, the method proceeds to step S75. In step S75, the EC 23 sets the over power protection level OPPL to be equal to the first protection level OPP_L1. If the current power consumption PC is not lower than the lower bound LB, then the method proceeds to step S76. In step S76, the EC 23 removes the record parameter ULBC.

Second Embodiment

Figure 6:
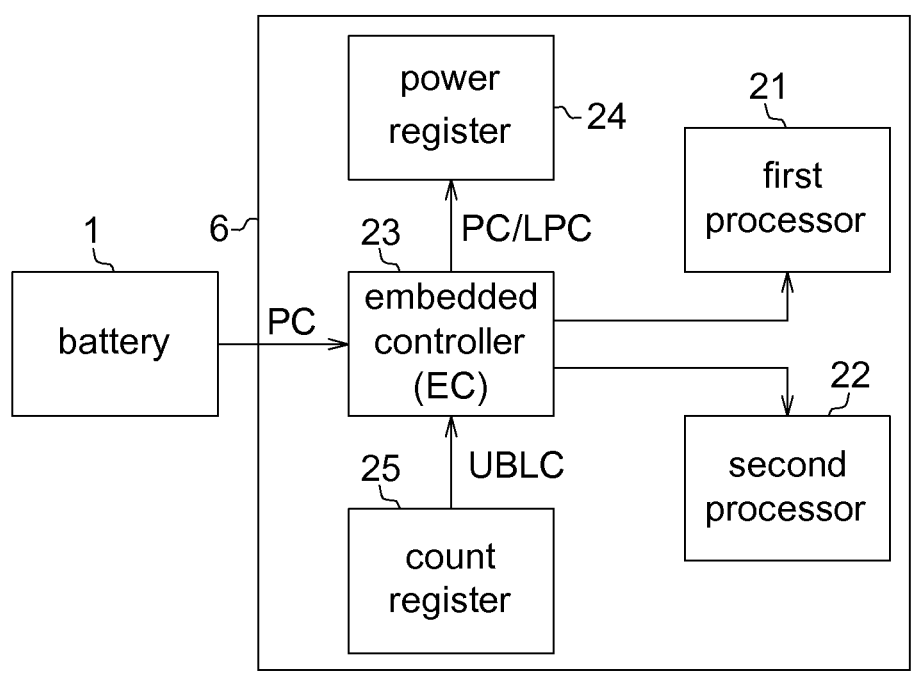
FIG. 6 is a block diagram of a portable electronic apparatus according to a second embodiment.

Referring to FIG. 6, a block diagram of a portable electronic apparatus according to a second embodiment is shown. The second embodiment is different from the first embodiment mainly in that the portable electronic apparatus 6 further comprises a second processor 22. In the second embodiment, the first processor 21 is such as a central processor, and the second processor 22 is such as a graphic processor. When the over power protection level OPPL is equal to the first protection level OPP_L1, the EC 23 controls the first processor 21 and the second processor 22 to cancel the throttling mechanism. When the over power protection level OPPL is equal to the second protection level OPP_L2, the EC 23 controls the first processor 21 and the second processor 22 to start a throttling mechanism.

Although the portable electronic apparatus disclosed in above embodiments is elaborated using the first protection level and the second protection level as example, the invention is not limited thereto. For example, a third protection level can be inserted between the first protection level and the second protection level. When the OPPL is equal to the third protection level, the EC controls the first processor to cancel the throttling mechanism and controls the second processor to start the throttling mechanism. Besides, number of proportional terms, derivative terms and integral terms can be adjusted according to number of protection levels.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A portable electronic apparatus, comprising:
   a first processor; and
   an embedded controller (EC) for capturing a current power consumption from a battery, calculating a delta power between the current power consumption and a last power consumption, setting a proportional term to be equal to an upper bound, and determining whether a current over power protection level (OPPL) is equal to a first protection level or a second protection level, wherein when the OPPL is equal to the first protection level, the EC executes a first protection level procedure during which the EC determines whether to set the OPPL to be equal to the second protection level according to the current power consumption, the proportional term, the last power consumption, a lower bound, the delta power and a derivative term, and when the OPPL is equal to the second protection level, the EC executes a second protection level procedure during which the EC determines whether to set the OPPL to be equal to the first protection level according to the current power consumption, the lower bound, the count that the power consumption is lower than the lower bound, and an integral term;
   wherein when the OPPL is equal to the first protection level, the EC controls the first processor to cancel a throttling mechanism, and when the OPPL is equal to the second protection level, the EC controls the first processor to start the throttling mechanism.

2. The portable electronic apparatus according to claim 1, wherein the first processor is a central processor or a graphic processor.

3. The portable electronic apparatus according to claim 1, further comprising a second processor, wherein when the OPPL is equal to the first protection level, the EC controls the first processor and the second processor to cancel the throttling mechanism, and when the OPPL is equal to the second protection level, the EC controls the first processor and the second processor to start the throttling mechanism.

4. The portable electronic apparatus according to claim 3, wherein the first processor is a central processor, and the second processor is a graphic processor.

5. The portable electronic apparatus according to claim 1, further comprising:
   a power register for storing the current power consumption.

6. The portable electronic apparatus according to claim 1, wherein during the first protection level procedure, the EC determines whether the current power consumption is greater than the proportional term, if the current power consumption is not greater than the proportional term, then the EC determines whether the current power consumption and the last power consumption both are greater than a lower bound, if the current power consumption and the last power consumption both are greater than the lower bound, then the EC determines whether the delta power is greater than the derivative term, if the delta power is greater than the derivative term, then the EC sets the OPPL to be equal to the second protection level.

7. The portable electronic apparatus according to claim 6, wherein if the current power consumption is greater than the proportional term, then the EC sets the OPPL to be equal to the second protection level.

8. The portable electronic apparatus according to claim 6, further comprising:
   a count register for storing the record parameter equal to the count that the power consumption is lower than the lower bound, wherein if not both the current power consumption and the last power consumption are greater than the lower bound, then the EC removes the record parameter.

9. The portable electronic apparatus according to claim 1, wherein during the second protection level procedure, the EC determines whether the current power consumption is lower than the lower bound, if the current power consumption is lower than the lower bound, then the EC progressively increases a record parameter equal to the count that the power consumption is lower than the lower bound, and determines whether the record parameter is greater than the integral term, if the record parameter is greater than the integral term, then the EC removes the record parameter and sets the OPPL to be equal to the first protection level.

10. The portable electronic apparatus according to claim 9, wherein if the current power consumption is not lower than the lower bound, then the EC removes the record parameter.

11. A power management method, comprising:
    capturing a current power consumption from a battery by an embedded controller (EC);
    calculating by the EC a delta power between the current power consumption and a last power consumption;
    setting a proportional term to be equal to an upper bound by the EC;
    determining by the EC whether a current over power protection level (OPPL) is equal to a first protection level or a second protection level;
    executing by the EC a first protection level procedure when the OPPL is equal to the first protection level, wherein during the first protection level procedure, whether to set the OPPL to be equal to the second protection level is determined by the EC according to the current power consumption, the proportional term, the last power consumption, a lower bound, the delta power and a derivative term; and
    executing a second protection level procedure by the EC when the OPPL is equal to the second protection level, wherein during the second protection level procedure, whether to set the OPPL to be equal to the first protection level is determined by the EC according to the current power consumption, the lower bound, the count that the power consumption is lower than the lower bound and an integral term;
    wherein when the OPPL is equal to the first protection level, a first processor is controlled to cancel a throttling mechanism;
    wherein when the OPPL is equal to the second protection level, the first processor is controlled to start the throttling mechanism.

12. The power management method according to claim 11, wherein the first processor is a central processor or a graphic processor.

13. The power management method according to claim 11, wherein when the OPPL is equal to the first protection level, the EC controls the first processor and a second processor to cancel the throttling mechanism, and when the OPPL is equal to the second protection level, the EC controls the first processor and the second processor to start the throttling mechanism.

14. The power management method according to claim 13, wherein the first processor is a central processor, the second processor is a graphic processor.

15. The power management method according to claim 11, further comprising:
   storing the current power consumption.

16. The power management method according to claim 11, wherein the step of executing the first protection level procedure comprises:
   determining whether the current power consumption is greater than the proportional term;
   determining whether the current power consumption and the last power consumption both are greater than a lower bound if the current power consumption is not greater than the proportional term;
   determining whether the delta power is greater than the derivative term if the current power consumption and the last power consumption both are greater than the lower bound; and
   setting the OPPL to be equal to the second protection level if the delta power is greater than the derivative term.

17. The power management method according to claim 16, wherein the step of executing the first protection level procedure further comprises:
   setting the OPPL to be equal to the second protection level if the current power consumption is greater than the proportional term.

18. The power management method according to claim 16, wherein the step of executing the first protection level procedure further comprises:
   removing a record parameter equal to the count that the power consumption is lower than the lower bound if not both the current power consumption and the last power consumption are greater than the lower bound.

19. The power management method according to claim 11, wherein the step of executing the second protection level procedure comprises:
   determining whether the current power consumption is lower than the lower bound;
   progressively increasing a record parameter equal to the count that the power consumption is lower than the lower bound if the current power consumption is lower than the lower bound;
   determining whether the record parameter is greater than the integral term; and
   removing the record parameter and setting the OPPL to be equal to the first protection level if the record parameter is greater than the integral term.

20. The power management method according to claim 19, wherein the step of executing the second protection level procedure further comprises:
   removing the record parameter if the current power consumption is not lower than the lower bound.

* * * * *